(12) United States Patent
Maruyama et al.

(10) Patent No.: US 8,757,312 B2
(45) Date of Patent: Jun. 24, 2014

(54) FRAME STRUCTURE FOR SADDLE-RIDE TYPE VEHICLE

(71) Applicant: Honda Motor Co., Ltd., Tokyo (JP)

(72) Inventors: Tomoyuki Maruyama, Wako (JP);
Hiroyuki Shinmura, Wako (JP);
Masashi Nagayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/798,877

(22) Filed: Mar. 13, 2013

(65) Prior Publication Data
US 2013/0249186 A1    Sep. 26, 2013

(30) Foreign Application Priority Data

Mar. 22, 2012 (JP) ................................. 2012-065153

(51) Int. Cl.
*B62K 11/02* (2006.01)
*B62K 11/10* (2006.01)

(52) U.S. Cl.
CPC ..................................... *B62K 11/10* (2013.01)
USPC ......................... 180/227; 180/219; 280/281.1

(58) Field of Classification Search
CPC ................................ B62K 11/10; B62K 11/02

USPC ................................ 180/227, 219; 280/281.1
See application file for complete search history.

(56) References Cited

U.S. PATENT DOCUMENTS

| | | | |
|---|---|---|---|
| 2007/0193807 A1* | 8/2007 | Yamamoto | 180/228 |
| 2012/0193161 A1* | 8/2012 | Chang et al. | 180/215 |
| 2013/0075179 A1* | 3/2013 | Iida | 180/220 |

FOREIGN PATENT DOCUMENTS

JP    2007-55584 A    3/2007

* cited by examiner

*Primary Examiner* — Joseph M Rocca
*Assistant Examiner* — Marlon Arce
(74) *Attorney, Agent, or Firm* — Birch, Stewart, Kolasch & Birch, LLP (57) ABSTRACT

A frame structure for a saddle-ride type vehicle includes a body frame having a head pipe, down tubes, seat rails and upper tubes and a unit swing power unit swingably supported by the body frame. The seat rails have front ends joined to downwardly extending portions of the down tubes. The down tube has a second bending portion formed at the rear end of the horizontal extending portion and an obliquely upwardly extending portion extending rearwardly and upwardly at a position behind the second bending portion. The obliquely upwardly extending portion has a rear end joined to the seat rail. The power unit support portion is formed behind the bending portion.

20 Claims, 8 Drawing Sheets

FRAME STRUCTURE FOR SADDLE-RIDE TYPE VEHICLE

CROSS-REFERENCE TO RELATED APPLICATIONS

The present application claims priority under 35 USC 119 to Japanese Patent Application No. 2012-065153 filed Mar. 22, 2012 the entire contents of that are hereby incorporated by reference.

BACKGROUND OF THE INVENTION

1. Field of the Invention

The present invention relates to a frame structure for a saddle-ride type vehicle provided with a unit swing power unit.

2. Description of Background Art

A scooter-type, saddle-ride type vehicle is known that is provided with a unit swing type engine, a unit swing power unit, having a swinging center at its lower portion. A support portion for the unit swing engine is formed on the body frame. The support portion is reinforced by a longitudinal frame member that vertically joins down tubes to corresponding seat rails. See, for example, Japanese Patent Laid-Open No. 2007-55584.

However, a conventional frame structure for a saddle-ride type vehicle is provided with a longitudinal frame member for increasing the support rigidity of the body frame side support portion for the unit swing engine. Therefore, the frame structure is complicated and thus increased in weight. The frame rigidity near the support portion for the engine is increased. Therefore, a load inputted from the unit swing engine side is transmitted to the entire body frame. Thus, it is difficult for the body frame to absorb the load inputted from the unit swing engine side.

SUMMARY AND OBJECTS OF THE INVENTION

The present invention has been made in view of such circumferences and aims to provide a frame structure for a saddle-ride type vehicle provided with a unit swing power unit wherein the rigidity balance of a body frame is improved to achieve a weight saving while making it possible for the body frame to efficiently absorb a load inputted from a unit swing power unit side.

To achieve the above object, an embodiment of the present invention includes a frame structure for a saddle-ride type vehicle having a body frame (F) with a head pipe (12) pivotally supporting a steering system. Down tubes (13, 13) are configured as a left and right pair with the down tube having a downwardly extending portion (70) having a front end joined to the head pipe (12) and extending rearwardly and downward, a first bending portion (73) bending rearwardly at a lower end of the downwardly extending portion (70) and a horizontal extending portion (71) extending rearwardly and generally horizontally from the first bending portion (73). Seat rails (14, 14) are configured as a left and right pair, disposed above the down tubes (13, 13), having respective front ends joined to the corresponding down tubes (13, 13) and extending rearwardly and upwardly. Upper tubes (15, 15) are configured as a left and right pair, having respective front ends joined to the head pipe (12), disposed above the down tubes (13, 13) and having respective rear ends joined to corresponding intermediate portions of the seat rails (14, 14). A unit swing power unit (U) is swingably supported by the body frame (F) and includes a swinging center on a lower portion side thereof. The seat rails (14, 14) are joined at front ends thereof to the corresponding downwardly extending portions (70) of the down tubes (13, 13) with each of the down tubes (13, 13) having a second bending portion (74) formed at a rear end of the horizontally extending portions (71) and an obliquely upwardly extending portion (72) extending rearwardly and upwardly at a position rearwardly of the second bending portion (74) and the obliquely upwardly extending portion (72) has a rear end joined to a corresponding one of the seat rails (14, 14). Power unit support portions (85, 85) are provided for supporting the unit swing power unit (U) with each being formed behind the second bending portion (74).

According to this configuration, the down tube includes the downwardly extending portion having the front end joined to the head pipe and extending rearwardly and downwardly, the first bending portion bending rearwardly at the lower end of the downwardly extending portion, the horizontal extending portion extending rearwardly and generally horizontally from the first bending portion, the second bending portion formed at the rear end of the horizontally extending portions and the obliquely upwardly extending portion extending rearwardly and upwardly at a position rearwardly of the second bending portion. The obliquely upwardly extending portion has a rear end joined to the seat rail. The seat rails are each joined at the front end thereof to the corresponding downwardly extending portion of the down tubes. The power unit support portions supporting the unit swing power unit are each formed behind the second bending portion. The power unit support portions are disposed rearwardly of and outwardly of the large frame-like frame portions composed of the seat rails and the down tubes. Thus, the load inputted from the unit swing engine side can effectively be absorbed by the body frame side by the use of the twisting of the frame portions. This frame structure does not employ a technique for receiving the load by adding the element of a frame to increase the rigidity of the body frame. However, the frame structure effectively absorbs the load by twisting the body frame to improve the rigidity balance of the body frame. Thus, a weight saving of the body frame can be achieved.

In the above configuration, each of the left and right down tubes (13, 13) may be configured as a single continuous tube having the downwardly extending portion (70), the horizontal extending portion (71) and the obliquely upwardly extending portion (72).

In this case, the down tube is a single continuous tube having the downwardly extending portion, the horizontal extending portion and the obliquely upwardly extending portion. Therefore, local stress concentration and deviation of rigidity can be suppressed over the entire down tube. The down tube can be twisted in a balanced manner. Thus, the load inputted from the unit swing power unit side can effectively be absorbed by the body frame side.

The joint portion (81) between the obliquely upwardly extending portion (72) and each of the seat rails (14, 14) may be configured to be formed rearwardly of a corresponding one of the power unit support portions (85, 85).

In this case, the joint portion between the obliquely upwardly extending portion and each of the seat rails is formed rearwardly of a corresponding one of the power unit support portions. Therefore, the interval between the joint portion between the front end of the seat rail and the downwardly extending portion of the down tube and the joint portion between the obliquely upwardly extending portion of the down tube and the seat rail can be increased. Thus, the down tube can be twisted moderately.

Further, the power unit support portions (85, 85) installed on the body frame (F) and the suspension boss (30A) formed on the unit swing power unit (U) side may be connected by the link member (27). The link member (27) may be installed so as to be relatively movable with respect to the body frame (F) via the connecting rod (87) connected to the body frame (F) and has the swinging center of the unit swing power unit (U), at the connecting portion between the link member (27) and the suspension boss (30A). The securing portion of the connecting rod (87) on the body frame (F) side may be configured to be formed on the power unit support portion (85).

With this configuration, the power unit support portions are each connected to the suspension boss formed on the unit swing power unit side and connected by the link member. The link member is installed so as to be relatively movable with respect to the body frame via the connecting rod connected to the body frame and has the swinging center of the unit swing power unit, at the connecting portion between the link member and the suspension boss. The securing portion of the connecting rod on the body frame side is formed on the power unit support portion. Therefore, the load inputted from the unit swing power unit can be collected by the power unit support portion via the link member. In this way, the down tube can be twisted by the load collected by the power unit support portion. The down tube can be twisted moderately. Thus, the load from the unit swing power unit can effectively be absorbed by the body frame side.

A front cross member (17) may be installed to connect, at right and left positions, joint portions (82) between the down tubes (13, 13) and the corresponding front ends of the seat rails (14, 14) that are formed at right and left positions.

In this case, the front cross member may be configured to be installed to connect, at right and left positions, the joint portions between the down tubes and the corresponding front ends of the seat rails that are formed at right and left positions. Therefore, the rigidity of a portion on the front end side of the seat rails and close to the head pipe is increased. This can makes it hard for the load from the unit swing power unit to be transmitted toward the head pipe.

Plate-like cross-members (83, 83) connecting the down tubes (13, 13) with the corresponding seat rails (14, 14) may be configured to be installed adjacent to and behind the corresponding joint portions (82) between the down tubes (13, 13) and the corresponding front ends of the seat rails (14, 14).

In this case, the plate-like cross-members connecting the down tubes with the corresponding seat rails is installed adjacent to and behind the corresponding joint portions between the down tubes and the corresponding front ends of the seat rails. Therefore, while ensuring the deflective performance of the horizontal extending portion and obliquely upwardly extending portion of the down tube, the connecting strength between the down tube and the seat rail can be ensured.

The intermediate cross member (20) connecting the left and right seat rails (14, 14) may be configured to be installed in front of the joint portions (81) between the obliquely upwardly extending portions (72) and the corresponding seat rails (14, 14).

In this case, the intermediate cross member connecting the left and right seat rails is installed in front of the joint portions between the obliquely upwardly extending portions and the corresponding seat rails. Therefore, while ensuring the deflective performance of the horizontal extending portion and obliquely upwardly extending portion of the down tube, the rigidity of the front portion of the seat rail can be increased. This can make it hard for the load from the unit swing power unit to be transmitted toward the head pipe.

The frame structure for a saddle-ride type vehicle according to an embodiment of the present invention is such that the power unit support portions supporting the unit swing power unit are disposed rearwardly of and outwardly of the large frame-like frame portions composed of the seat rails and the down tubes. Thus, the load inputted from the unit swing engine side can effectively be absorbed by the body frame side by the use of the twisting of the large frames.

The down tube is a single continuous tube. Therefore, local stress concentration and deviation of rigidity can be suppressed over the entire down tube. In addition, the down tube can be twisted in a balanced manner.

The interval between the joint portion between the front end of the seat rail and the downwardly extending portion of the down tube and the joint portion between the obliquely upwardly extending portion of the down tube and the seat rail can be increased. Thus, the down tube can be twisted moderately.

Further, the load inputted from the unit swing power unit can be collected by the power unit support portions via the link member. The down tube can be twisted by the load collected by the power unit support portion. The down tube can be twisted moderately. Thus, the load from the unit swing power unit can effectively be absorbed by the body frame side.

The rigidity of a portion on the front end side of the seat rails and close to the head pipe is increased by the front cross member. This can makes it hard for the load from the unit swing power unit to be transmitted toward the head pipe.

The plate-like cross-members installed adjacent to and behind the corresponding joint portions between the down tubes and the corresponding seat rails can ensure the connecting strength between the down tube and the seat rail while ensuring the deflective performance of the horizontal extending portion and obliquely upwardly extending portion of the down tube.

Further, the intermediate cross member can increase the rigidity of the front portion of the seat rail while ensuring the deflective performance of the horizontal extending portion and obliquely upwardly extending portion of the down tube. This can make it hard for the load from the unit swing power unit to be transmitted toward the head pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

A motorcycle provided with a frame structure according to an embodiment of the present invention will hereinafter be described with reference to the drawings. With regard to directions such as front and back or rear, left and right, and upside and downside in the description, the directions are the same as those with respect to a vehicle body unless otherwise described. In the figures, symbol FR denotes the front of the vehicle body, UP denotes the upside of the vehicle body and LE denotes the left of the vehicle body.

Figure 1:
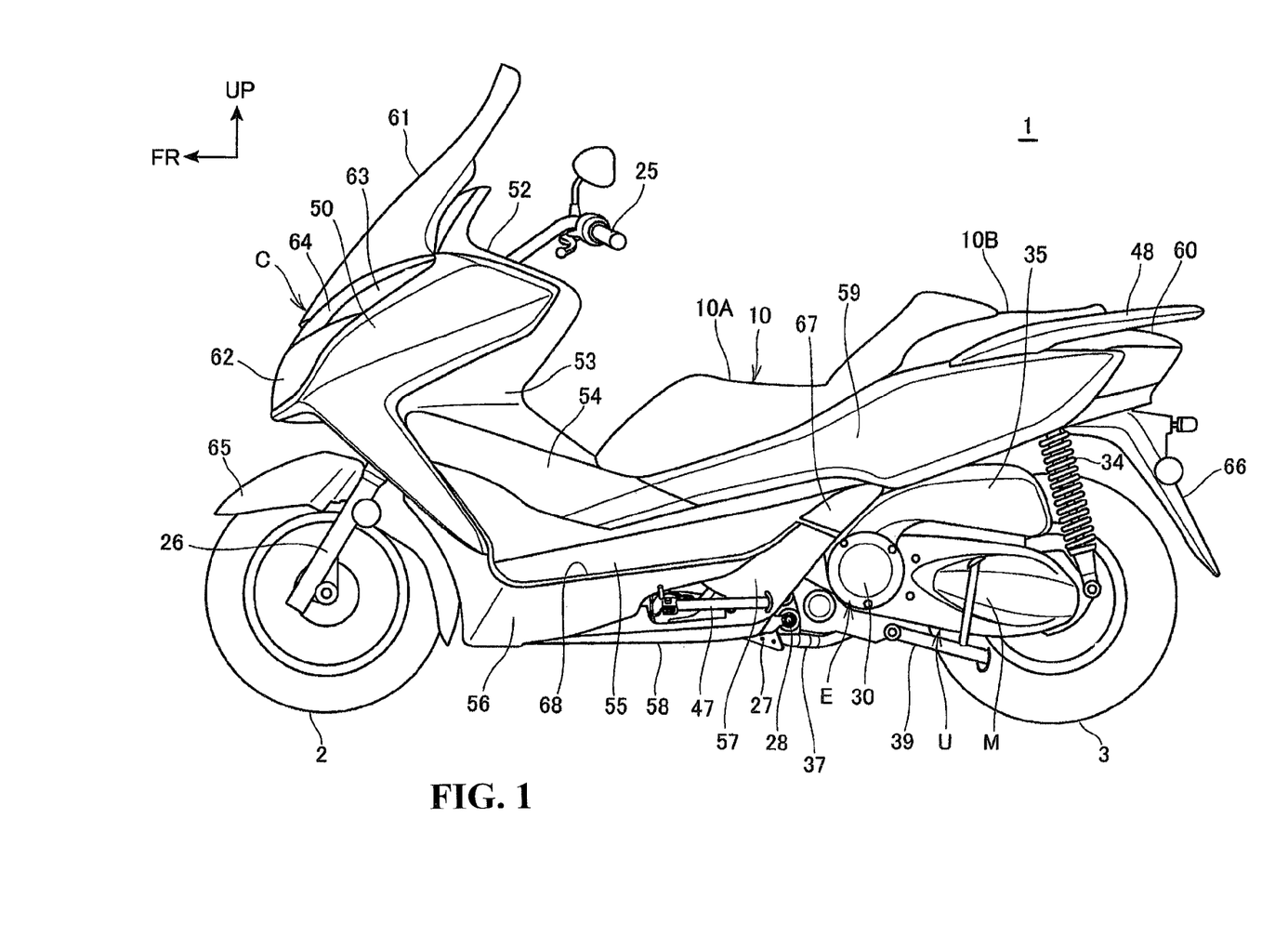
FIG. 1 is a left lateral view of a motorcycle according to an embodiment of the present invention.

FIG. 1 is a left lateral view of the motorcycle according to the embodiment of the present invention.

Figure 2:
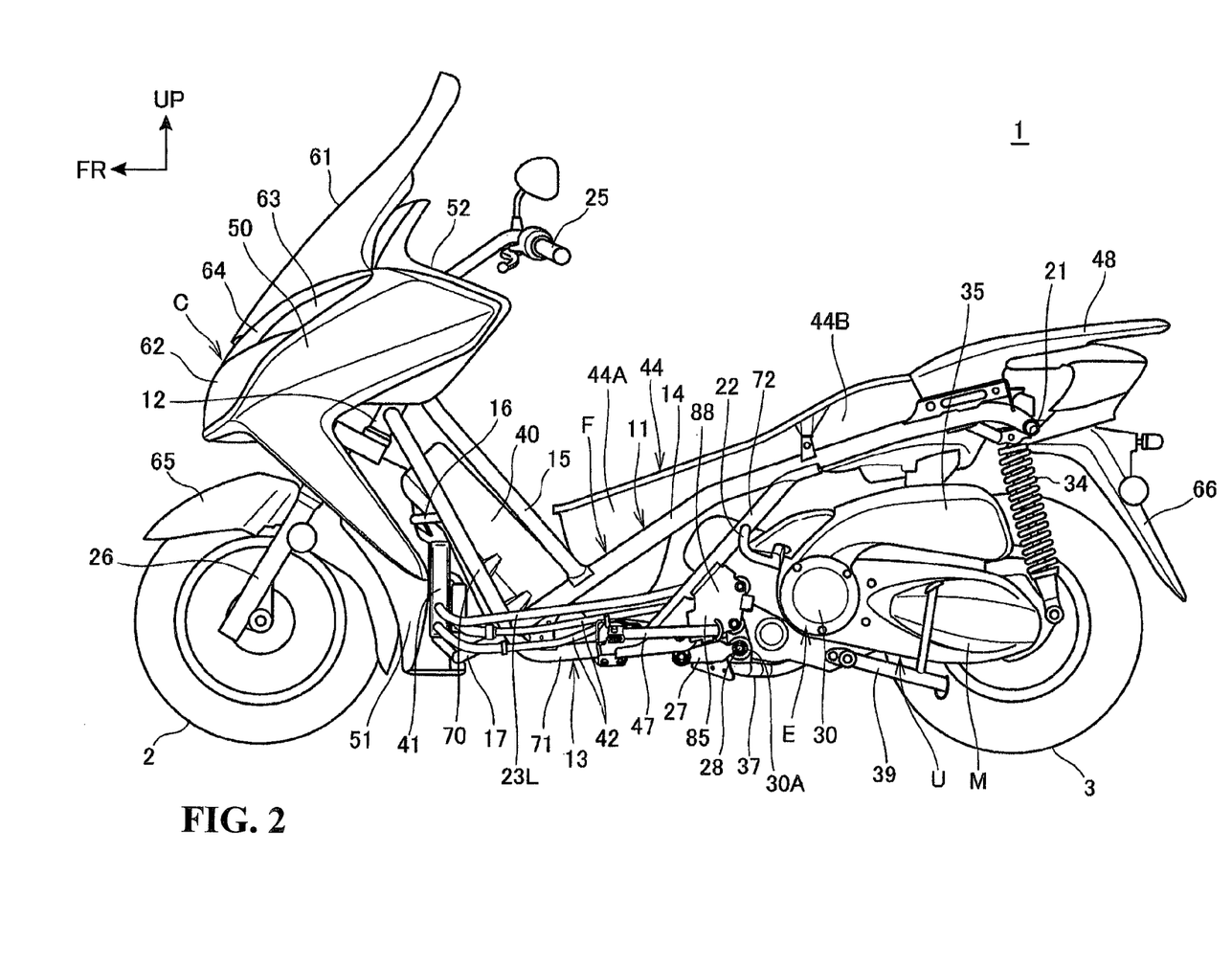
FIG. 2 is a left lateral view of an internal structure of the motorcycle.

A motorcycle 1 (a saddle-ride type vehicle) is a scooter-type vehicle having low step floors 68 on which the feet of an occupant sitting on a seat are positioned. The motorcycle 1 has a front wheel 2 in front of a body frame F (FIG. 2). A rear wheel 3, that is a drive wheel, is rotatably supported by a unit swing engine U (a unit swing power unit) disposed in the rear portion of the vehicle. The body frame F is covered by a body cover C made of resin.

Figure 3:
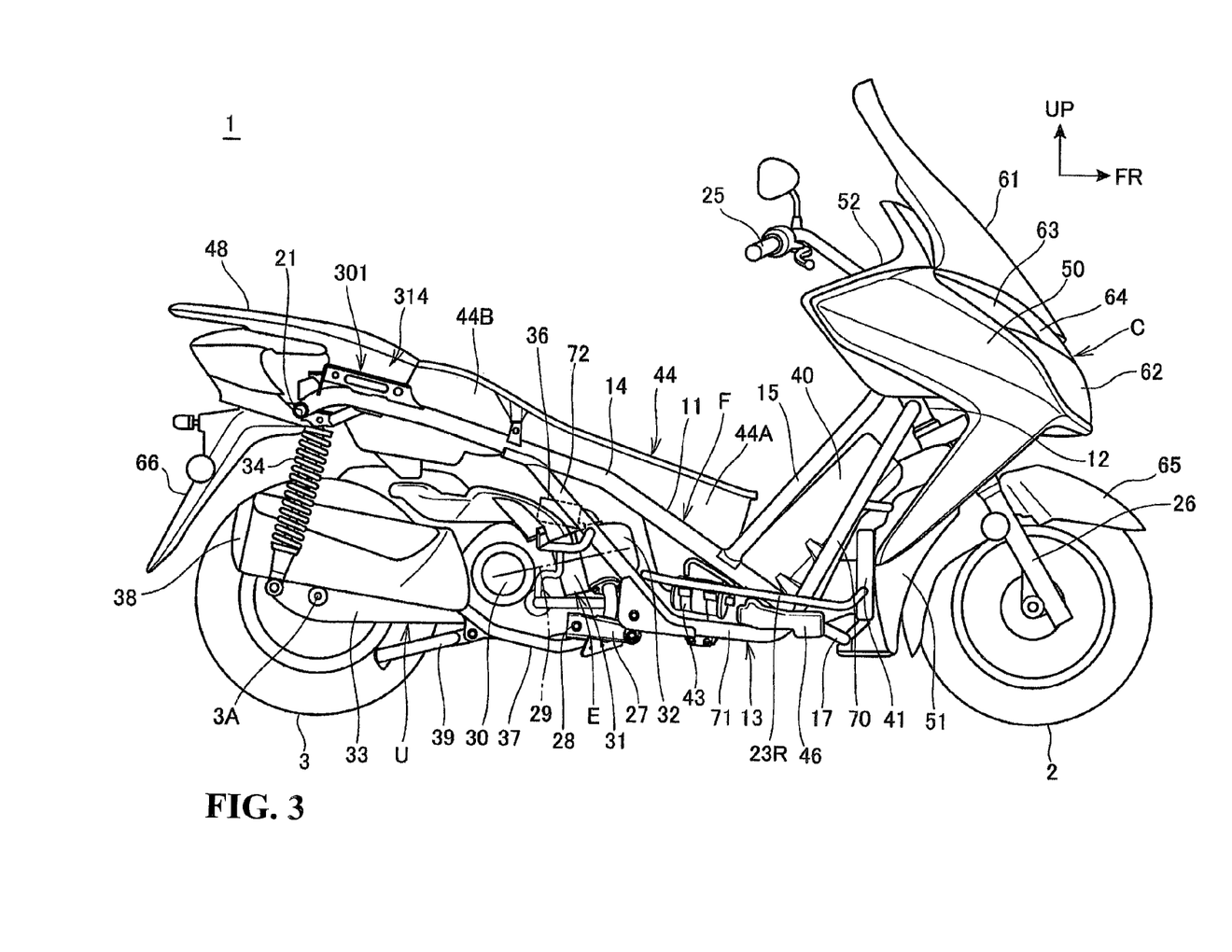
FIG. 3 is a right lateral view of the internal structure of the motorcycle.
Figure 4:
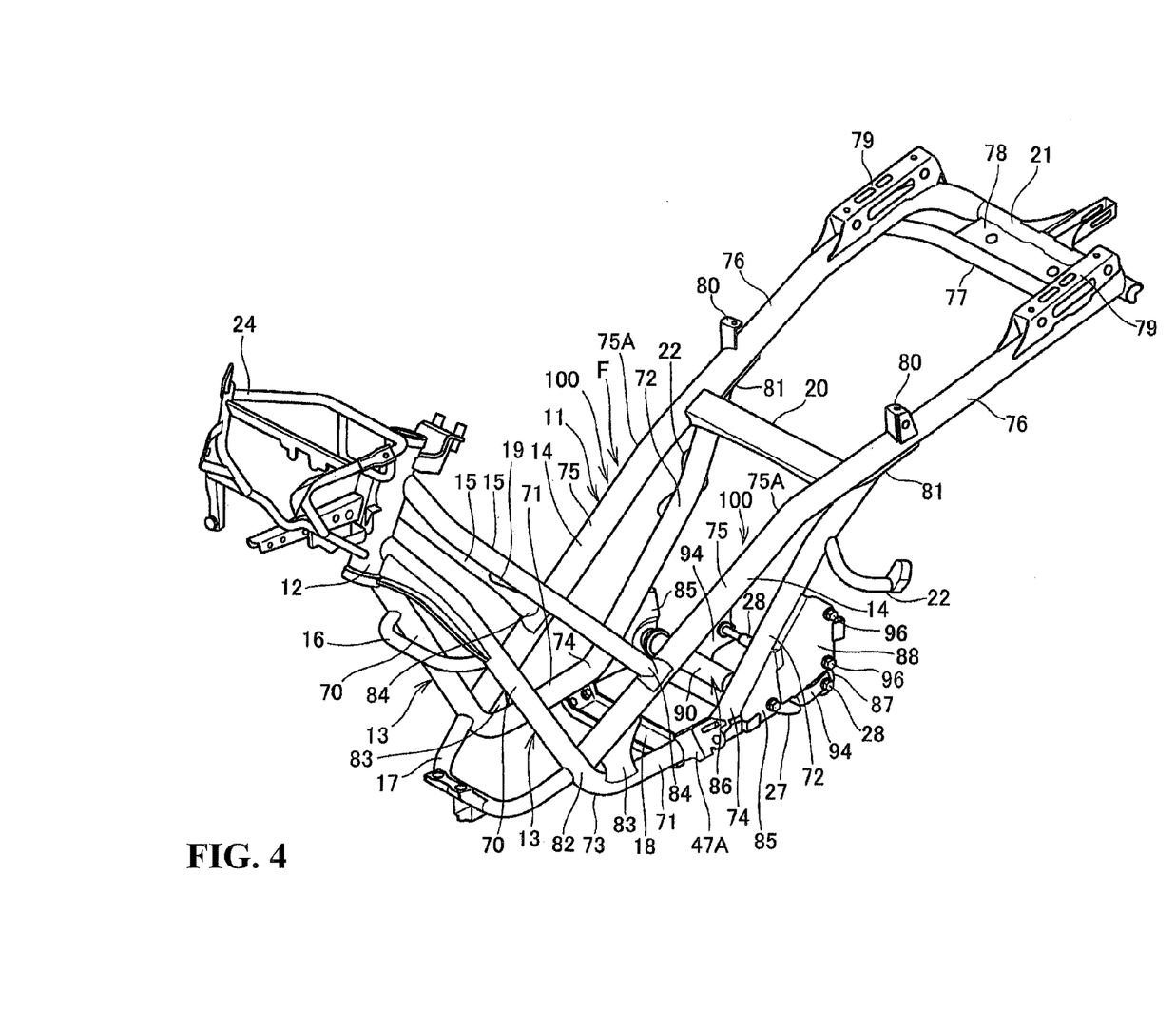
FIG. 4 is a perspective view of a body frame.

FIG. 2 is a left lateral view of an internal structure of the motorcycle 1. FIG. 3 is a right lateral view of the internal structure of the motorcycle 1. FIG. 4 is a perspective view of a body frame F. In addition, FIGS. 2 and 3 show a state where the body cover C is partially removed.

As shown in FIGS. 2 to 4, the body frame F is formed by connecting a plurality of metallic tubes or pipes by welding. A main frame 11 includes a head pipe 12 installed in a front portion; a pair of left and right down tubes 13, 13 extending rearwardly and downwardly from the head pipe 12, then extending generally horizontally rearwardly, and extending rearwardly and upwardly in a rear portion; a pair of left and right seat rails 14, 14 extending rearwardly and upwardly from the corresponding lower portions of the down tubes 13, 13 to the rear portion of the vehicle; and a pair of left and right upper tubes 15, 15 extending rearwardly and downwardly from the head pipe 12 at a position above the down tubes 13, 13 and coupled to corresponding seat rails 14, 14.

Each of the down tubes 13, 13 includes a downwardly extending portion 70 having a front end joined to the head pipe 12 and extending rearwardly and downwardly; a horizontally extending portion 71 extending rearwardly and generally horizontally from the lower end of the downwardly extending portion 70; and an obliquely upwardly extending portion 72 extending rearwardly and upwardly from the rear end of the horizontally extending portion 71.

As shown in FIG. 4, the main frame 11 includes a front upper cross member 16 connecting upper portions of downwardly extending portions 70, 70 of the down tubes 13, 13, the front upper cross member 16 serving as a cross member connecting the left and right frames; a front cross member 17 connecting lower portions of the downwardly extending portions 70, 70; and a horizontal cross member 18 connecting the horizontally extending portions 71, 71 of the down tubes 13, 13. Further, the main frame 11 includes an upper cross member 19 connecting the upper tubes 15, 15; an intermediate cross member 20 connecting the seat rails 14, 14; and a rear cross member 21 connecting rear portions of the seat rails 14, 14. The horizontal cross member 18 is bolted to the horizontally extending portions 71, 71.

A pair of left and right tandem step stays 22, 22 extending outwardly in a vehicle-width direction is installed on the upper portions of the obliquely upwardly extending portions 72, 72 of the down tubes 13, 13.

A basket-like foreside frame 24 supporting lamps, a body cover C and the like is joined to the front surface of the head pipe 12.

A pair of left and right step frames 23L, 23R (FIGS. 2 and 3) coupled to the respective down tubes 13, 13, extend back and forth for supporting step floors 68 from below is installed on the external side of the main frame 11.

As shown in FIGS. 1 to 3, a steering system 5 for steering the front wheel 2 has a steering shaft (not shown) turnably supported by the head pipe 12, a handlebar 25 coupled to the upper portion of the steering shaft, and a pair of left and right front forks 26, 26 connected to the lower end of the steering shaft. The front wheel 2 is pivotally supported by the lower ends of the front forks 26, 26 and is steered by the operation of the handlebar 25.

The unit swing engine U is of a unit swing type wherein the engine E and a transmission case M housing a belt type continuously variable engine (not shown) are integrated. In addition, the unit swing engine U functions as a swing arm for supporting the rear wheel 3. The unit swing engine U is connected to rear portions of the down tubes 13, 13 via a link member 27 connected to a front portion thereof. In addition, the unit swing engine U is vertically swingable around a pivot shaft 28 installed on the link member 27.

The engine E is a water-cooled four-cycle single-cylinder engine and is disposed such that a cylinder axis 29 extends forward and roughly horizontally. The engine E is configured such that a cylinder 31 and a cylinder head 32 joined to each other are located on the front surface of a crankcase 30 disposed in the front portion of the unit swing engine U.

The transmission case M extends from the rear portion of the crankcase 30 and passes on the left side of the rear wheel 3 toward the rear. An arm portion 33 (FIG. 3) passing the right side of the rear wheel 3 and extending toward the rear is installed in the rear portion of the crankcase 30. The rear wheel 3 is supported by an axle 3A installed between the rear portion of the transmission case M and the rear portion of the arm portion 33. The power of the engine E is transmitted to the rear wheel 3 via the above-mentioned continuously variable transmission.

A pair of left and right rear suspensions 34, 34 is spanned between the rear end of the transmission case M and the seat rail 14 and between the rear end of the arm portion 33 and the seat rail 14.

An air cleaner box 35 adapted to suck outside air is installed on the upper surface of the transmission case M. The air cleaner box 35 is connected via a connecting tube not shown to a throttle body 36 coupled to an intake port located on an upper surface of the cylinder head 32.

An exhaust pipe 37 connected to an exhaust port located on a lower surface of the cylinder head 32 passes below the engine E, extends rearwardly and is coupled to a muffler 38 secured to an external side surface of the arm portion 33.

A main stand 39 capable of supporting the vehicle in an upright state is installed below the rear portion of the transmission case M.

A fuel tank 40 for storing fuel for the engine E is formed to have a front surface extending along the downwardly extending portion 70 of the down tube 13 and a rear surface extending along the upper tube 15. As to the vertical direction, the fuel tank 40 vertically lengthwise extends from the back of the lower portion of the head pipe 12 to the vicinity of the horizontally extending portion 71 of the down tube 13. The fuel tank 40 is disposed between the left and right down tubes 13, 13 so as to be tilted forward.

A plate-like radiator 41 for cooling the cooling water of the engine E is installed in space below the front portion of the forward tilted fuel tank 40. A pair of cooling water pipes 42 connecting the radiator 41 with the engine E extends from the left side portion of the radiator 41, then extends below the step frame 23L (FIG. 2) on the left (one side) of the vehicle, passes inside the down tube 13 and is connected to the engine E.

A side stand 47 is attached to the left horizontally extending portion 71.

A reservoir tank 46 for storing a portion of cooling water of the radiator 41 is disposed below the step frame 23R (one of the step frames) (FIG. 3) on the right side (the other side) of the vehicle at a position behind the radiator 41. A canister 43 adapted to adsorb evaporated fuel in the fuel tank 40 is located below the step frame 23R at a position behind the reservoir 46.

A storage box 44 for storing articles is disposed between the seat rails 14, 14. The storage box 44 extends from the vicinity of the rear portion of the fuel tank 40 to above the transmission case M along the seat rails 14, 14 in a posterior-superior direction. The storage box 44 is integrally formed of a front storage portion 44A and a rear storage portion 44B by resin molding. The front storage portion 44A is disposed between the fuel tank 40 and the obliquely upwardly extending portion 72 of the down tube 13. The rear storage portion 44B is disposed above the unit swing engine U.

The upper surface of the storage box 44 is opened over the entire length thereof. This opening is closed by an occupant seat 10 (FIG. 1) in an openable and closable manner. The seat 10 has a front seat 10A on that a rider sits and a rear seat 10B that is formed a little higher than the front seat 10A and on which a pillion passenger sits.

A grab rail 48 is secured to the rear portions of the seat rails 14, 14 at a position behind the storage box 44.

As shown in FIG. 1, the body cover C includes a front cover 50, a front lower cover 51 (FIGS. 2 and 3), an upper cover 52, an upper inner cover 53, a pair of left and right lower inner covers 54, 54, a pair of left and right step covers 55, 55 (FIGS. 2 and 3), a pair of left and right front floor skirts 56, 56, a pair of left and right rear floor skirts 57, 57, an under cover 58, a pair of left and right body side covers 59, 59, and a tail cover 60. The front cover 50 covers the front and left and right sides of the head pipe 12 and extends below the front of the downwardly extending portion 70. The front lower cover 51 is joined to the lower portion of the front cover 50 and located behind the front wheel 2. The upper cover 52 is joined to the upper portion of the front cover 50 at a position below the handlebar 25. The upper inner cover 53 is joined to the left and right edge portions of the front cover 50 and covers the head pipe 12, the upper tubes 15, 15 and the downwardly extending portion 70 from the rear and sides. The lower inner covers 54, 54 are joined to the lower edge of the upper inner cover 53 and cover the upper tubes 15, 15 and the downwardly extending portion 70. The step covers 55, 55 are joined to the lower portion of the front cover 50 and the lower edges of the lower inner covers 54, 54 and cover the step frames 23L, 23R from above. The front floor skirts 56, 56 are joined to the lower portion of the front cover 50 and the lower portions of the step covers 55, 55 and cover the step frames 23L, 23R from the sides. The rear floor skirts 57, 57 are continuous with the front floor skirts 56, 56, extend rearwardly and cover the down tubes 13, 13. The under cover 58 covers the left and right horizontally extending portions 71, 71 from below. The body side covers 59, 59 are joined to the rear portions of the lower inner covers 54, 54 and of the step covers 55, 55 and cover the storage box 44 and the seat rails 14, 14 from the sides at a position below the seat 10. The tail cover 60 is joined to the rear portions of the body side covers 59, 59.

Step floors 68 on which feet of a rider sitting on the front seat 10A are positioned are formed on the bottoms of the left and right step covers 55, 55.

A windshield 61 extending in a posterior-superior direction is installed in the front portion of the front cover 50. A headlight 62 is installed at the front end of the front cover 50. A pair of left and right turn signals 63 is installed to be continuous with the upper portion of the headlight 62. A plate-like garnish 64 is installed between the headlight 62 and the windshield 61.

A front fender 65 covering the front wheel 2 from above is installed on the front forks 26, 26. A rear fender 66 covering the rear wheel 3 from above is installed below the body side covers 59, 59.

A pair of foldable tandem steps 67 (FIG. 1) on which feet of a pillion passenger sitting on the rear seat 10B are positioned is supported by the tandem step stays 22, 22.

A detailed description is hereinafter given of a frame structure for the motorcycle 1.

Figure 5:
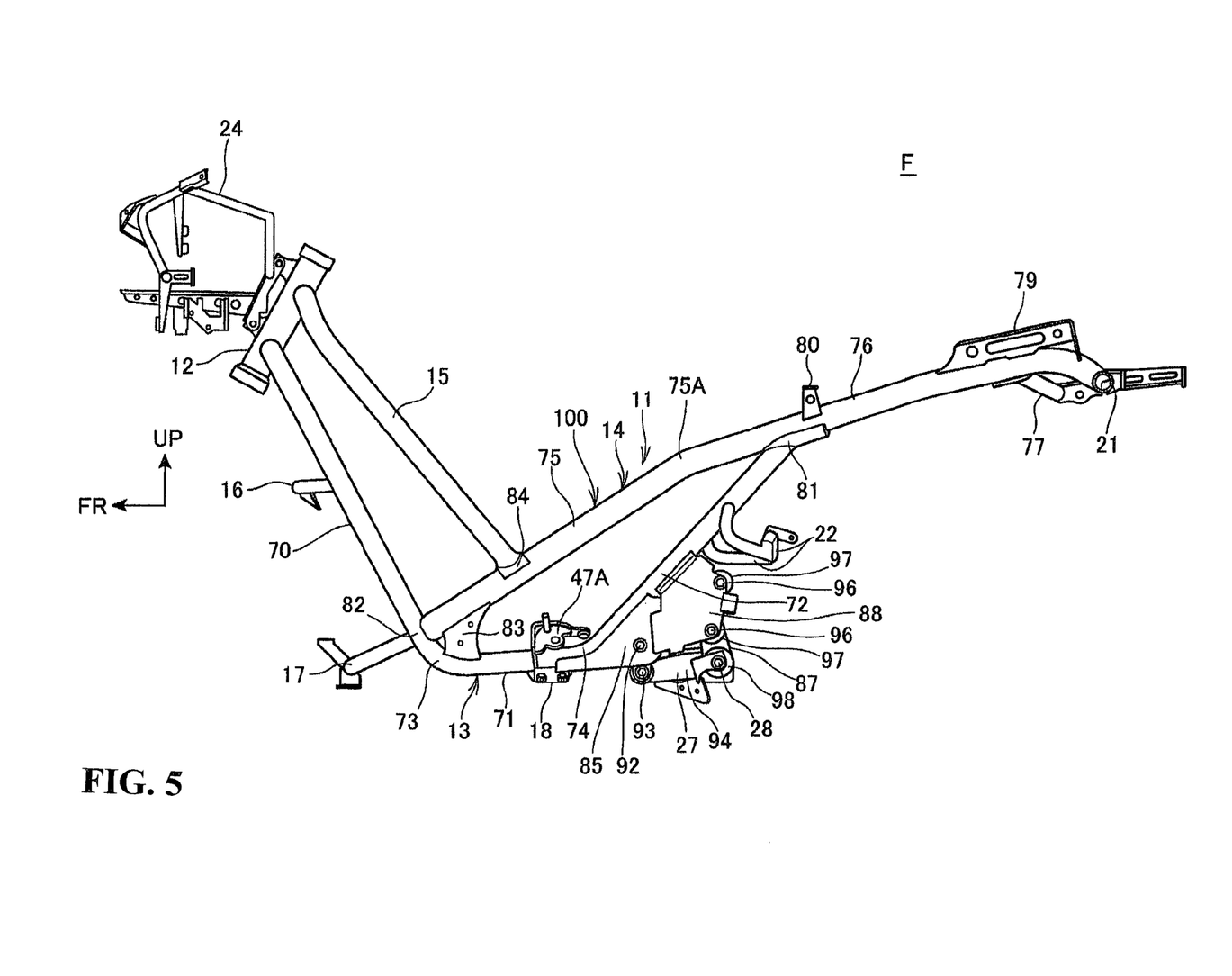
FIG. 5 is a left lateral view of the body frame.
Figure 6:
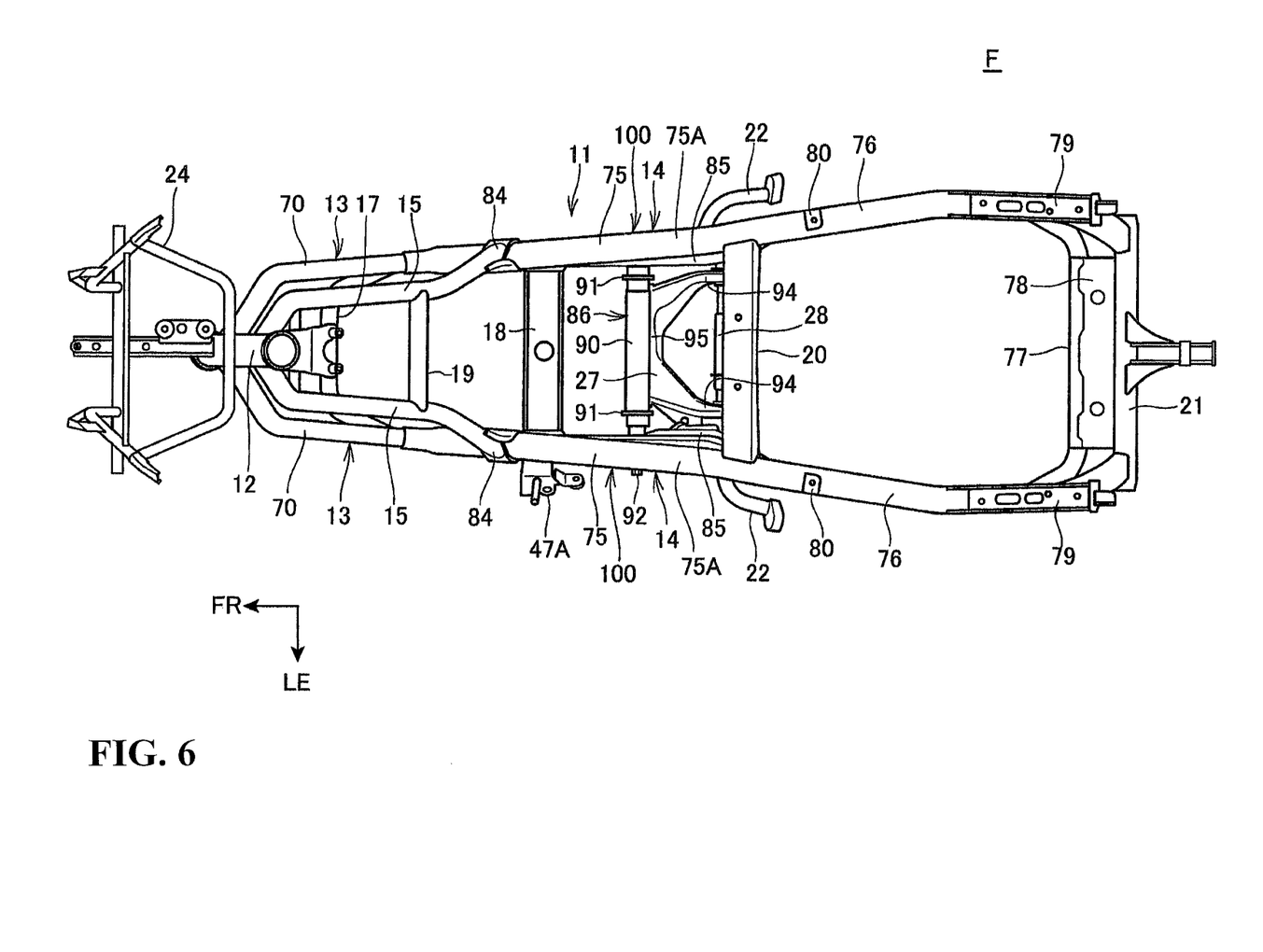
FIG. 6 is a top view of the body frame.
Figure 7:
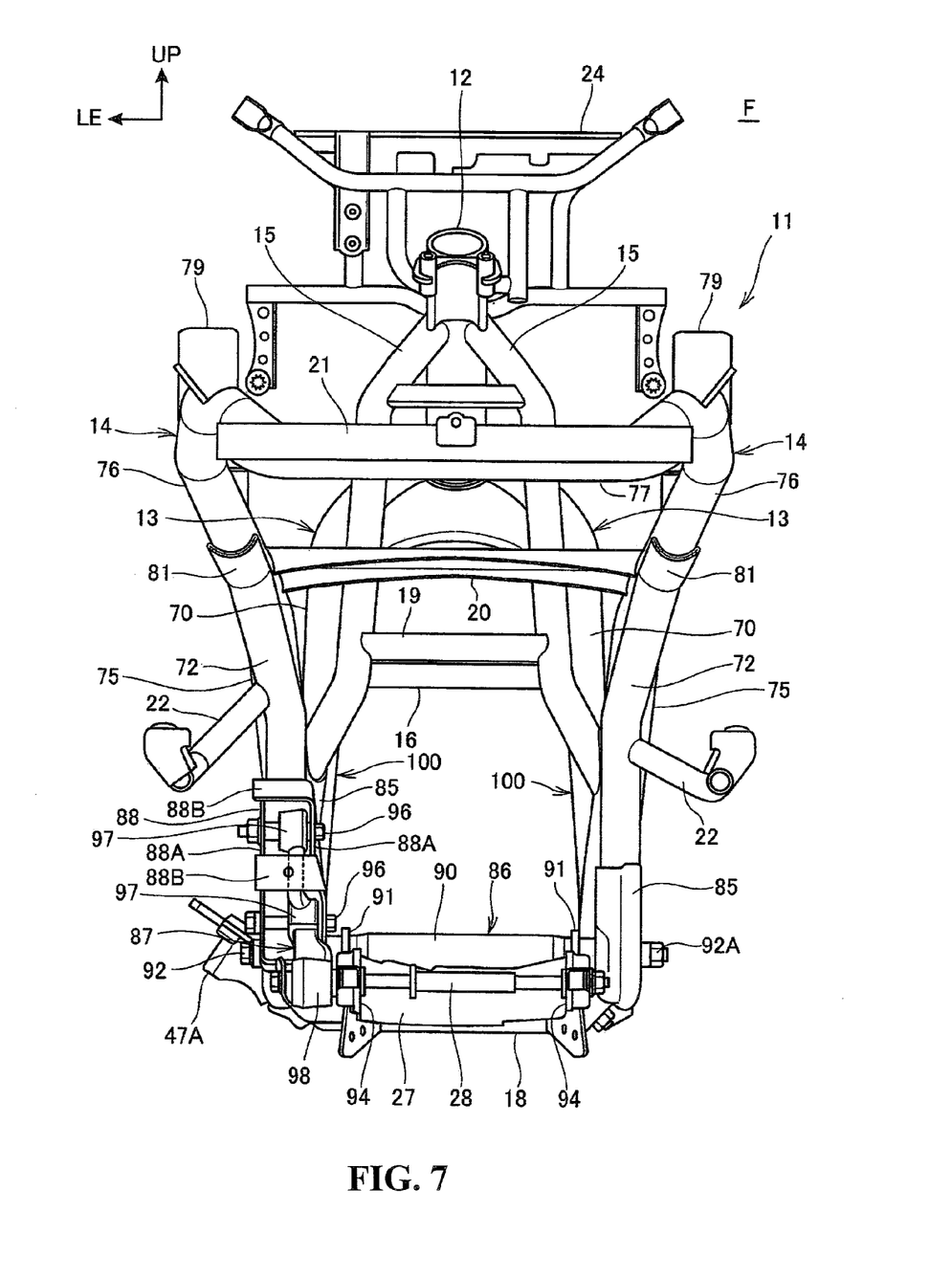
FIG. 7 is a rear view of the body frame.

FIG. 5 is a left lateral view of the body frame F. FIG. 6 is a top view of the body frame F. FIG. 7 is a rear view of the body frame F.

As shown in FIGS. 4 to 7, each of the down tubes 13, 13 includes the downwardly extending portion 70 having a front end joined to the lower portion of the head pipe 12; a first bending portion 73 bending rearwardly at the lower end of the downwardly extending portion 70; the horizontal extending portion 71 extending rearwardly from the first bending portion 73; a second bending portion 74 formed at the rear end of the horizontal extending portion 71 so as to bend rearwardly and upwardly; and the obliquely upwardly extending portion 72 extending rearwardly and upwardly from the second bending portion 74 and having a rear end coupled to the seat rails 14, 14. The down tube 13 is formed by bending a single continuous metal tube at the first bending portion 73 and the second bending portion 74 by the use a bender. The interval between the left and right down tubes 13, 13 is gradually increased as it goes towards the rear.

The pair of left and right power unit support portions 85, 85 supporting the unit swing engine U via the link member 27 is formed behind the second bending portion 74.

A side stay 47A to that the side stand 47 is attached is installed on the side of the horizontal cross member 18 at the left-hand horizontal extending portion 71.

Each of the seat rails 14, 14 includes a seat rail front portion 75 and a seat rail rear portion 76. The seat rail front portion 75 is joined at its front end to the rear surface of the lower portion of the downwardly extending portion 70 of the down tube 13, extends rearwardly and upwardly, and is joined at its rear end to the rear end of the upwardly extending portion 72. The seat rail rear portion 76 extends from the rear end of the seat rail front portion 75 to the rear portion of the vehicle. The interval between the left and right seat rails 14, 14 is gradually increased as it goes towards the rear.

A rear second cross member 77 connecting the seat rails 14, 14 is installed in front of the rear cross member 21 of the seat rail rear portions 76. The rear second cross member 77 and the rear cross member 21 are connected by a reinforcing plate 78 extending back and forth. A grab rail stay 79 to that the grab rail 48 is coupled is installed on the upper surface of each of the seat rail rear portions 76. A box stay 80 to that the storage box 44 is connected is attached to the front portion of each of the seat rail rear portions 76.

The seat rail front portions 75, 75 are each bent at a seat rail bending portion 75A located at its rear portion. A portion, of each of the seat rails 14, 14, to the rear of the seat rail bending portion 75A has a posterior-superior angle gentler than the front portion of each of the seat rails 14, 14.

The plate-like intermediate cross member 20 is installed between the rear portions of the seat rail front portions 75, 75. In addition, the intermediate cross member 20 is located forward of a rear joint portion 81 where each of the seat rails 14, 14 is joined to a corresponding one of the rear ends of the obliquely upwardly extending portions 72. A front joint portion 82 where the front end of the seat rail front portion 75 is joined to the downwardly extending portion 70 is installed at the lower end of the downwardly extending portion 70. The front cross member 17 is formed in a forward projecting U-shape and joined to the front surfaces of the left and right front joint portions 82, 82. A plate-like cross member 83 connecting the seat rail front portion 75 with the horizontal extending portion 71 is installed behind and near the front joint portion 82. The plate-like cross member 83 is a vertically extending flat plate.

The upper tubes 15, 15 are each joined at its front end to the upper portion of the head pipe 12, extending rearwardly and downwardly at a gentler slope than the downwardly extending portion 70, and joined at its rear end to the upper surface of the seat rail front portion 75. An upper tube joint portion 84 where the lower end of each of the upper tubes 15, 15 is joined to the seat rail front portion 75 is located rearwardly of the plate-like cross member 83. An interval between the left and right upper tubes 15, 15 is gradually increased as it goes towards the rear. As viewed from the above, the upper tubes 15, 15 are located inside the down tubes 13, 13 over the entire length thereof.

Figure 8:
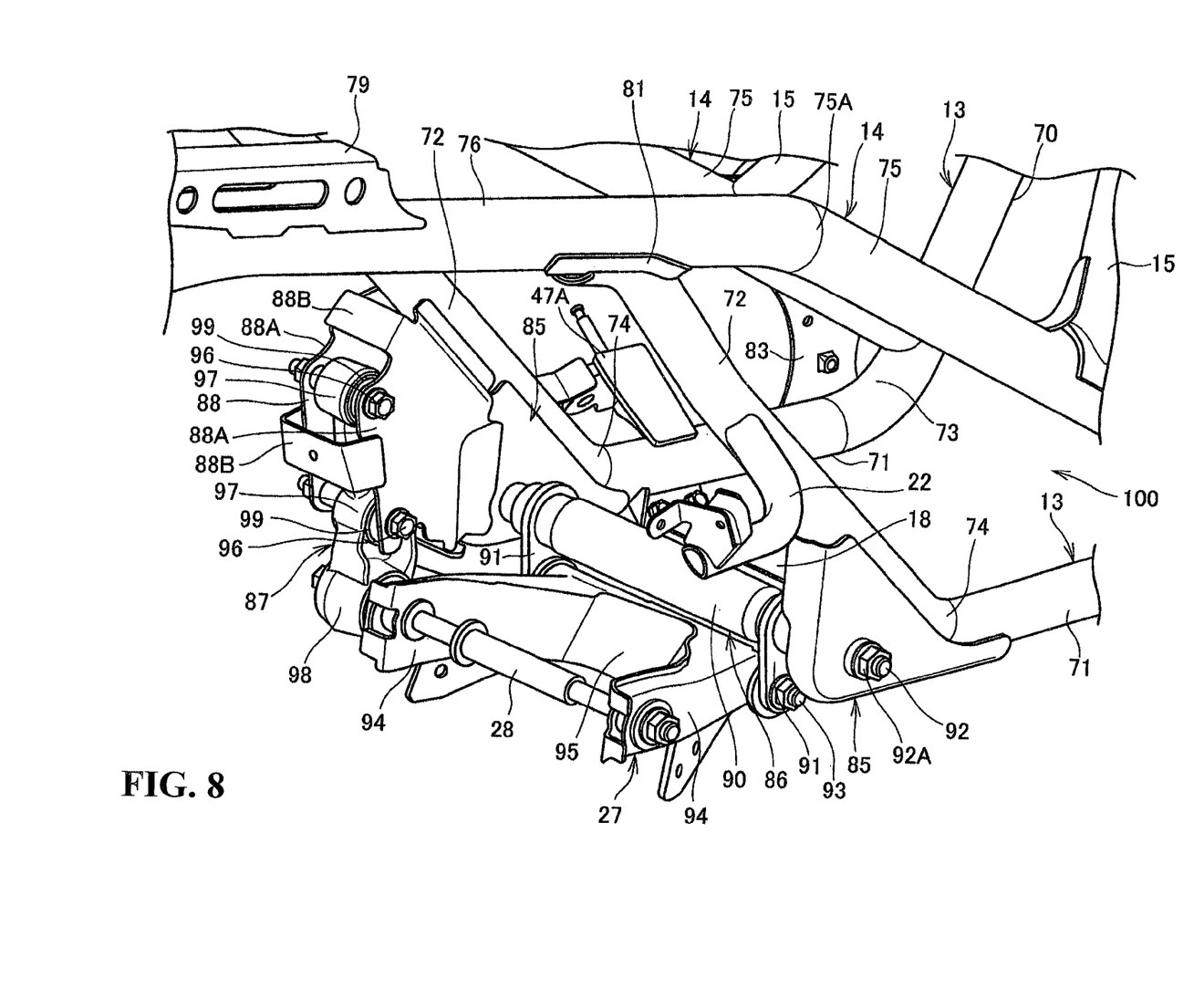
FIG. 8 is a perspective view of a power unit support portion as viewed from the back.

FIG. 8 is a perspective view of the power unit support portion 85 as viewed from the rear.

As shown in FIGS. 4 to 8, the power unit support portions 85, 85 are each installed from the second bending portion 74 of each of the left and right down tubes 13, 13 to the corresponding lower portion of the obliquely upwardly extending portion 72. The link member 27 is connected to the power unit support portions 85, 85 by means of a front end connecting member 86 supporting the front end of the link member 27 and of a connecting rod 87 supporting the rear end of the link member 27.

The power unit support portions 85, 85 are each formed by connecting a box-like member formed of a metal plate to the rear surfaces of the second bending portion 74 and the obliquely upwardly extending portion 72. The power unit support portion 85 is hollow. A left power unit support portion 85 further has a connecting rod support portion 88 extending rearwardly and upwardly. The connecting rod support portion 88 is configured by joining a pair of plate members 88A, 88A spaced away from each other to the rear surfaces of the power unit support portion 85 and the obliquely upwardly extending portion 72. The connecting rod 87 is supported between the plate members 88A, 88A. The plate members 88A, 88A are reinforced by being connected by connecting plates 88B provided at their rear portions.

The front end connecting member 86 has a pipe 90, a pair of stay plates 91, 91 and a support bolt 92. The pipe 90 is spanned between the power unit support portions 85, 85. The stay plates 91, 91 project vehicle-downwardly from both ends of the pipe 90. The support bolt 92 is inserted through one of the power unit support portions 85 from the outside, passes through the pipe 90 and the other power unit support portion 85 and is fastened by a nut 92A. The stay plates 91, 91 are each provided with a bolt hole (not shown) at its end. A single bolt 93 is inserted through the bolt hole to connect the link member 27 with the front end connecting member 86.

The link member 27 has a pair of arm portions 94, 94 extending back and forth and a cross portion 95 connecting the front ends of the arm portions 94, 94. The link member 27 has the cross portion 95 disposed between the stay plates 91, 91 and is pivotally supported by the bolt 93 inserted through the stay plates 91, 91 and the cross portion 95. A rubber bushing (not shown), in contact with the outer circumference of the bolt 93, is installed in a hole of the cross portion 95 through which the bolt 93 is inserted. Thus, the link member 27 is elastically supported by the front end connecting member 86.

A pivot shaft 28 is spanned between the rear ends of the arm portions 94, 94. A support hole portion 30A (a suspension boss) (FIG. 2) formed in a lower portion of the crankcase 30 is disposed between the rear ends of the arm portions 94, 94. The unit swing engine U is pivotally supported by the pivot shaft 28 inserted through the support hole portion 30A. In other words, the swinging center of the unit swing engine U is the pivot shaft 28 and is located at the rear portion of the link member 27.

The connecting rod 87 is secured to the left power unit support portion 85 by means of two securing bolts 96, 96 fastened to the connecting rod support portion 88 of the left power unit support portion 85. The connecting rod 87 is a rod that is disposed so as to extend in a vertical direction. In addition, the connecting rod 87 has, at an upper portion and an intermediate portion, securing hole portions 97, 97 adapted to receive the securing bolts 96, 96 inserted therethrough. Further, the connecting rod 87 has, at its lower portion, a pivot connecting portion 98 pivotally supporting the pivot shaft 28. The pivot connecting portion 98 is connected for relative rotation to a pivot projecting portion 28A in that the pivot shaft 28 projects outwardly from the left arm portion 94.

Rubber bushings 99, 99, in contact with the outer circumferential surfaces of the securing bolts 96, 96, are installed on the inner circumferential surfaces of the securing hole portions 97, 97 of the connecting rod 87. The connecting rod 87 is elastically supported by the connecting rod support portion 88. Thus, the connecting rod 87 can be displaced vertically and longitudinally in accordance with the amount of deflection of the rubber bushes 99, 99. In addition, the link member 27 connected to the connecting rod 87 is displaced in accordance with the displacement the connecting rod 87.

More particularly, the link member 27 supporting the unit swing engine U is elastically supported by the power unit support portions 85, 85 via the above rubber bushings (not shown) of the cross portion 95 and the rubber bushings 99, 99 so as to be able to be displaced vertically and longitudinally. A load inputted from the rear wheel 3 to the unit swing engine U is transmitted to the link member 27 via the pivot shaft 28. In addition, the load is partially absorbed because of the displacement of the link member 27. Thus, the ride quality of the motorcycle 1 is improved.

As shown in FIG. 4, the body frame F is formed with a frame portion 100 formed by the seat rail front portion 75, the first bending portion 73 of each of the down tubes 13, 13, the horizontal extending portion 71, the second bending portion 74 and the obliquely upwardly extending portion 72. The power unit support portion 85 is formed on each of the frame portions 100, 100. In the present embodiment, the frame portion 100 is preferentially twisted over the other portions of the body frame F so as to absorb a load inputted from the unit swing engine U via the link member 27 and each of the power unit support portions 85, 85 to the body frame F. Thus, an improvement in ride quality can be achieved.

In the frame portion 100, the front end of the seat rail front portion 75 is joined to the upper portion of the first bending portion 73. In addition, the obliquely upwardly bending portion extends rearwardly and upwardly and is joined to the rear end of the seat rail front portion 75 at the rear joint portion 81 rearwardly of each of the power unit support portions 85, 85. In this way, the frame portion 100 is formed like a relatively large frame. Thus, the frame portion 100 can moderately be twisted so as to absorb a load inputted from the unit swing engine U.

The down tubes 13, 13 are each formed by bending a single continuous metal tube at the first bending portion 73 and the second bending portion 74 by the use a bender. In addition, the down tube 13 is integrally composed of the downwardly extending portion 70, the first bending portion 73, the horizontal extending portion 71, the second bending portion 74 and the obliquely upwardly extending portion 72. The down tube 13 can suppress the occurrence of local stress concentration and of deviation of rigidity in the frame portion 100 compared with the configuration wherein a plurality of tubes is joined together by welding or the like. Thus, the frame portion 100 can be twisted in a balanced manner, and can effectively absorb a load inputted from the unit swing engine U.

The power unit support portions 85, 85 are each installed at the anteroposteriorly central portion of the frame portion 100. Therefore, a load from the unit swing engine U can uniformly be received and thus effectively absorbed by the overall frame portion 100. Further, the frame portion 100 provided with each of the power unit portions 85, 85 is preferentially twisted. Therefore, it is possible to prevent a heavy load from being transmitted toward the upper tubes 15, 15, the downwardly extending portion 70 and the head pipe 12. Thus, an influence of the load from the unit swing engine U on the steering system can be reduced.

The front cross member 17 is installed at the front end portion of the frame portions 100 so as to be joined to the front joint portions 82, 82 at the lower portions of the downwardly extending portions 70. Therefore, while ensuring the deflective performance (twisting property) of the frame portion 100, the rigidity of the down tubes 13, 13 can be increased. Thus, it is possible to prevent a heavy load from being transmitted to the steering system on the head pipe 12 side via the downwardly extending portions 70. Consequently, an influence of the load from the unit swing engine U on the steering system can be reduced.

The intermediate cross member 20 forward of the rear joint portions 81, 81 of the seat rail front portions 75 is installed at the rear end portion of the frame portion 100. Therefore, while ensuring the deflective performance of the horizontal extending portion 71 and the obliquely upwardly extending portion 72, the rigidity of the seat rails 14, 14 can be increased. Thus, it is possible to prevent a load from being transmitted to the steering system via the seat rails 14, 14, and consequently, an influence of the load from the unit swing engine U on the steering system can be reduced.

Further, the vertically extending plate-like cross member 83 connects each of the seat rails 14, 14 with a corresponding one of the horizontal extending portions 71 at a position near the front joint portion 82. Therefore, while ensuring the connecting strength between the seat rails 14, 14 and the corresponding horizontal extending portions 71, the frame portion 100 can moderately be twisted. The plate-like cross member 83 has lower rigidity than that of a pipe-like cross member. Therefore, while ensuring the connecting strength, the deflective performance of the frame portion 100 can be ensured.

A pipe-like cross member having high rigidity is not installed inside the frame portion 100. Therefore, the frame portion 100 can moderately be twisted. Thus, the frame portion 100 can effectively absorb a load from the unit swing engine U.

As described above, according to the embodiment to that the present invention is applied, each of the down tubes 13, 13 includes the downwardly extending portion 70 having the front end joined to the head pipe 12 and extending rearwardly and downwardly; the first bending portion 73 bending rearwardly at the lower end of the downwardly extending portion 70; the horizontal extending portion 71 extending rearwardly and generally horizontally from the first bending portion 73; the second bending portion 74 formed at the rear end of the horizontal extending portion 71; and the obliquely upwardly extending portion 72 extending rearwardly and upwardly at a position towards the rear of the second bending portion 74. The obliquely upwardly extending portions 72 have rear ends joined to the respective seat rails 14, 14. The seat rails 14, 14 are joined at their front ends to the respective downwardly extending portions 70 of the down tubes 13, 13. The power unit support portions 85, 85 supporting the unit swing engine U are formed rearwardly of the second bending portions 74. The power unit support portions 85, 85 are disposed rearwardly of and outwardly of the large frame-like frame portions 100, 100 composed of the seat rails 14, 14 and the down tubes 13, 13. Thus, the load inputted from the unit swing engine U side can effectively be absorbed by the body frame F side by the use of the twisting of the frame portions 100, 100. This frame structure does not employ a technique for receiving the load by adding the element of a frame to increase the rigidity of the body frame F. However, the frame structure effectively absorbs the load by twisting the body frame F to improve the rigidity balance of the body frame F. Thus, weight saving of the body frame F can be achieved.

Each of the down tubes 13, 13 is the single continuous tube having the downwardly extending portion 70, the horizontal extending portion 71 and the obliquely upwardly extending portion 72. Therefore, the occurrence of local stress concentration and of deviation of rigidity can be suppressed over the overall down tubes 13, 13. That is to say, the down tubes 13, 13 can be twisted in a balanced manner. Thus, the load inputted from the unit swing engine U side can effectively be absorbed by the frame portions 100, 100.

The rear joint portions 81, 81, that are joint portions between the obliquely upwardly extending portions 72 and the corresponding seat rails 14, 14, are formed rearwardly of the corresponding power unit support portions 85, 85. Therefore, the intervals between the rear joint portions 81, 81 and the corresponding front joint portions 82, 82 that are joint portions between the front ends of the seat rails 14, 14 and the corresponding downwardly extending portions 70 of the down tubes 13, 13 can be increased. Thus, the frame portions 100, 100 can moderately be twisted.

Further, the power unit support portions 85, 85 and the support hole portion 30A formed in the lower portion of the crankcase 30 of the unit swing engine U are connected via the link member 27. The link member 27 is installed so as to be relatively movable with respect to the body frame F via the connecting rod 87. In addition, the link member 27 has the pivot shaft 28 serving as the swinging center of the unit swing engine U, at the connecting portion between the link member 27 and the support hole portion 30A. The connecting rod support portion 88 serving as the fastening portion of the connecting rod 87 on the body frame F side is formed on the left-hand power unit support portion 85. The load inputted from the unit swing engine U is collected by the power unit support portions 85, 85 via the link member 27. The frame portions 100, 100 can be twisted by the load collected by the power unit support portions 85, 85. The frame portions 100, 100 can moderately be twisted. Thus, the frame portions 100, 100 can effectively absorb the load from the unit swing engine U.

The front cross member 17 is installed to connect at left and right positions the front joint portions 82, 82 that are joint portions between the down tubes 13, 13 and the corresponding front ends of the seat rails 14, 14. The rigidity of a portion near the head pipe 12 on the front end side of the seat rails 14, 14 is increased. This can make it hard for the load from the unit swing engine U to be transmitted to the steering system on the head pipe 12 side.

The plate-like cross members 83, 83 connecting the down tubes 13, 13 with the corresponding seat rails 14, 14 are installed adjacent to and towards the rear of the front joint portions 82, 82. Therefore, while ensuring the deflective performance of the horizontal extending portions 71 and obliquely upwardly extending portions 72 of the down tubes 13, 13, the connection strength between the down tubes 13, 13 and the seat rails 14, 14 can be ensured.

The intermediate cross member 20 connecting the left and right seat rails 14, 14 is installed in front of the rear joint portions 81, 81 that are the connecting portions between the obliquely upwardly extending portions 72 and the corresponding seat rails 14, 14. Therefore, while ensuring the deflective performance of the horizontal extending portions 71 and obliquely upwardly extending portions 72 of the down tubes 13, 13, the rigidity of the seat rail front portions 75, 75 can be increased. This can make it hard for the load from the unit swing engine U to be transmitted to the steering system on the head pipe 12 side.

In addition, the embodiment described above shows one aspect embodying the present invention. The present invention is not limited to the embodiment described above.

The embodiment described above gives an explanation taking the unit swing engine U as a unit swing power unit by way of example. However, the present invention is not limited to this. The unit swing power unit may be a unit swing type power unit for an electrically driven saddle-ride type vehicle wherein, for example, a motor for driving the rear wheel 3 is incorporated in a case also serving as a swing arm swingably supported by the pivot shaft 28.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure for a saddle-ride vehicle comprising:
a body frame including:
a head pipe pivotally supporting a steering system;
down tubes configured as a left and right pair, the down tube having a downwardly extending portion having a front end joined to the head pipe and extending rearwardly and downwardly, a first bending portion bending rearwardly at a lower end of the downwardly extending portion, and a horizontal extending portion extending rearwardly and generally horizontally from the first bending portion;
seat rails configured as a left and right pair, disposed above the down tubes, said seat rails having respective front ends joined to the corresponding down tubes and extending rearwardly and upwardly; and
upper tubes configured as a left and right pair, having respective front ends joined to the head pipe, disposed above the down tubes and having respective rear ends joined to corresponding intermediate portions of the seat rails; and
a unit swing power unit swingably supported by the body frame and having a swinging center on a lower portion side thereof;
wherein the seat rails are joined at front ends thereof to the corresponding downwardly extending portions of the down tubes;
each of the down tubes has a second bending portion formed at a rear end of the horizontally extending portions and an obliquely upwardly extending portion extending rearwardly and upwardly at a position rearwardly of the second bending portion, and the obliquely upwardly extending portion has a rear end joined to a corresponding one of the seat rails; and
power unit support portions supporting the unit swing power unit are each formed behind the second bending portion.

2. The frame structure for a saddle-ride vehicle according to claim 1, wherein each of the left and right down tubes is a single continuous tube having the downwardly extending portion, the horizontal extending portion and the obliquely upwardly extending portion.

3. The frame structure for a saddle-ride vehicle according to claim 2, wherein a joint portion between the obliquely upwardly extending portion and each of the seat rails is formed rearwardly of a corresponding one of the power unit support portions.

4. The frame structure for a saddle-ride vehicle according to claim 1, wherein the power unit support portions are installed on the body frame and a suspension boss formed on the unit swing power unit side are connected by a link member;
the link member is installed so as to be relatively movable with respect to the body frame via a connecting rod connected to the body frame and has a swinging center of the unit swing power unit, at the connecting portion between the link member and the suspension boss; and
a securing portion of the connecting rod on the body frame side is formed on the power unit support portion.

5. The frame structure for a saddle-ride vehicle according to claim 2, wherein the power unit support portions are installed on the body frame and a suspension boss formed on the unit swing power unit side are connected by a link member;
the link member is installed so as to be relatively movable with respect to the body frame via a connecting rod connected to the body frame and has a swinging center of the unit swing power unit, at the connecting portion between the link member and the suspension boss; and
a securing portion of the connecting rod on the body frame side is formed on the power unit support portion.

6. The frame structure for a saddle-ride vehicle according to claim 3, wherein the power unit support portions are installed on the body frame and a suspension boss formed on the unit swing power unit side are connected by a link member;
the link member is installed so as to be relatively movable with respect to the body frame via a connecting rod connected to the body frame and has a swinging center of the unit swing power unit, at the connecting portion between the link member and the suspension boss; and
a securing portion of the connecting rod on the body frame side is formed on the power unit support portion.

7. The frame structure for a saddle-ride vehicle according to claim 1, wherein a front cross member is installed to connect, at right and left positions, joint portions between the down tubes and the corresponding front ends of the seat rails that are formed at right and left positions.

8. The frame structure for a saddle-ride vehicle according to claim 2, wherein a front cross member is installed to connect, at right and left positions, joint portions between the down tubes and the corresponding front ends of the seat rails that are formed at right and left positions.

9. The frame structure for a saddle-ride vehicle according to claim 3, wherein a front cross member is installed to connect, at right and left positions, joint portions between the down tubes and the corresponding front ends of the seat rails that are formed at right and left positions.

10. The frame structure for a saddle-ride vehicle according to claim 4, wherein a front cross member is installed to connect, at right and left positions, joint portions between the down tubes and the corresponding front ends of the seat rails that are formed at right and left positions.

11. The frame structure for a saddle-ride vehicle according to claim 1, wherein plate-like cross-members connecting the down tubes with the corresponding seat rails are installed adjacent to and behind the corresponding joint portions between the down tubes and the corresponding front ends of the seat rails.

12. The frame structure for a saddle-ride vehicle according to claim 2, wherein plate-like cross-members connecting the down tubes with the corresponding seat rails are installed adjacent to and behind the corresponding joint portions between the down tubes and the corresponding front ends of the seat rails.

13. The frame structure for a saddle-ride vehicle according to claim 3, wherein plate-like cross-members connecting the down tubes with the corresponding seat rails are installed adjacent to and behind the corresponding joint portions between the down tubes and the corresponding front ends of the seat rails.

14. The frame structure for a saddle-ride vehicle according to claim 1, wherein an intermediate cross member connecting the left and right seat rails is installed in front of the joint portions between the obliquely upwardly extending portions and the corresponding seat rails.

15. The frame structure for a saddle-ride vehicle according to claim 2, wherein an intermediate cross member connecting the left and right seat rails is installed in front of the joint portions between the obliquely upwardly extending portions and the corresponding seat rails.

16. The frame structure for a saddle-ride vehicle according to claim 3, wherein an intermediate cross member connecting the left and right seat rails is installed in front of the joint portions between the obliquely upwardly extending portions and the corresponding seat rails.

17. A frame structure for a saddle-ride vehicle comprising:
a body frame including:
  a head pipe pivotally supporting a handlebar;
  left and right down tubes having a downwardly extending portion with a front end joined to the head pipe and extending rearwardly and downwardly, a first bending portion bending rearwardly at a lower end of the downwardly extending portion, and a horizontal extending portion extending rearwardly and generally horizontally from the first bending portion;
  left and right seat rails disposed above the down tubes and having respective front ends joined to the corresponding down tubes and extending rearwardly and upwardly; and
  left and right upper tubes having respective front ends joined to the head pipe, said left and right upper tubes being disposed above the down tubes and having respective rear ends joined to corresponding intermediate portions of the seat rails; and
a unit swing power unit swingably supported by the body frame and having a swinging center on a lower portion side thereof;
wherein the seat rails are joined at front ends thereof to the corresponding downwardly extending portions of the down tubes;
a second bending portion formed on each of the down tubes, said second bending portion being formed at a rear end of the horizontally extending portions and an obliquely upwardly extending portion extending rearwardly and upwardly at a position rearwardly of the second bending portion, and the obliquely upwardly extending portion has a rear end joined to a corresponding one of the seat rails; and
power unit support portions supporting the unit swing power unit are each formed behind the second bending portion.

18. The frame structure for a saddle-ride vehicle according to claim 17, wherein each of the left and right down tubes is a single continuous tube having the downwardly extending portion, the horizontal extending portion and the obliquely upwardly extending portion.

19. The frame structure for a saddle-ride vehicle according to claim 18, wherein a joint portion between the obliquely upwardly extending portion and each of the seat rails is formed rearwardly of a corresponding one of the power unit support portions.

20. The frame structure for a saddle-ride vehicle according to claim 17, wherein the power unit support portions are installed on the body frame and a suspension boss formed on the unit swing power unit side are connected by a link member;
the link member is installed so as to be relatively movable with respect to the body frame via a connecting rod connected to the body frame and has a swinging center of the unit swing power unit, at the connecting portion between the link member and the suspension boss; and
a securing portion of the connecting rod on the body frame side is formed on the power unit support portion.

* * * * *